US007050697B1

(12) United States Patent
Stevenson

(10) Patent No.: US 7,050,697 B1
(45) Date of Patent: May 23, 2006

(54) PIXEL ARRANGEMENT FOR ORGANIC ELECTRONIC DEVICES

(75) Inventor: Matthew Stevenson, Santa Maria, CA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/025,424

(22) Filed: Dec. 29, 2004

(51) Int. Cl.
*G02B 6/00* (2006.01)

(52) U.S. Cl. ........................ 385/147; 385/14; 430/200; 313/500; 257/40

(58) Field of Classification Search .................. 385/14, 385/147; 430/200, 964, 270.1, 271.1; 313/500, 313/506; 257/40, 675
See application file for complete search history.

(56) References Cited

U.S. PATENT DOCUMENTS

| | | | | |
|---|---|---|---|---|
| 5,541,625 | A | 7/1996 | Holstun et al. | 347/40 |
| 6,485,884 | B1 * | 11/2002 | Wolk et al. | 430/200 |
| 2002/0054197 | A1 | 5/2002 | Okada et al. | 347/101 |
| 2002/0109457 | A1 | 8/2002 | Duineveld et al. | 313/504 |
| 2005/0236614 | A1 * | 10/2005 | Parker | 257/40 |

FOREIGN PATENT DOCUMENTS

| | | |
|---|---|---|
| WO | WO 03/092072 | 11/2003 |

OTHER PUBLICATIONS

U.S. Appl. No. 10/705,321, filed Nov. 10, 2003, MacPherson et al.
U.S. Appl. No. 10/889,883, filed Jul. 13, 2004, MacPherson et al.

* cited by examiner

*Primary Examiner*—Phan Palmer

(57) ABSTRACT

An electronic device including a plurality of pixels is provided. Each pixel includes fist, second, and third subpixels, which, from a plan view, the first subpixels are arranged in a spaced apart relation; for each pixel, the second subpixel is disposed on a first side of the first subpixel, the third subpixel is disposed on a second side of the first subpixel, and the second side is opposite the first side on a first axis; and, for pixels adjacent on the first axis, either the second subpixels of the adjacent pixels are adjacent to each other on the first axis, or the third subpixels of the adjacent pixels are adjacent to each other on the first axis; and for pixels adjacent on a second axis perpendicular to the first axis, the first subpixels of the adjacent pixels on the second axis are adjacent to each other on the second axis.

19 Claims, 4 Drawing Sheets

PIXEL ARRANGEMENT FOR ORGANIC ELECTRONIC DEVICES

FIELD OF THE INVENTION

This invention relates in general to electronic devices and methods for forming electronic devices. More specifically, the invention relates to electronic devices including organic electronic devices.

BACKGROUND INFORMATION

The manufacture of organic electronic devices may be performed using solution deposition techniques. One process for making organic electronic devices is to deposit organic material layers on a substrate by ink jet printing. In an ink jet process, the liquid composition of the ink drops includes an organic material in a solution, dispersion, emulsion, or suspension with an organic solvent or with an aqueous solvent. After deposition, the solvent is evaporated and the organic material remains to form an active layer for the organic electronic device.

Forming high-resolution patterns, e.g., 200 dpi (dots per inch) with ink jet printing technology requires that each droplet be relatively small. Typically, for a device with 100 to 130 dpi, the droplet volume ranges between a few tenths of a pico-liter to a few pico-liters. When the volume of the droplet is in this range, fluctuations of the volume among different droplets become significant, as the volume stability must be controlled. In addition, because of the small volume and mass of each droplet, control of the delivery to pre-defined locations becomes a factor, as the fluctuation of spatial accuracy may occur due to process limitations, e.g., substrate or printhead movement, or delivery system.

There remains a need for an electronic device with high resolution.

SUMMARY OF THE INVENTION

In one embodiment, an electronic device including a plurality of pixels, each pixel including first, second, and third subpixels, which, from a plan view, a plurality of first subpixels are arranged in a spaced apart relation; for each pixel, the second subpixel is disposed on a first side of the first subpixel, the third subpixel is disposed on a second side of the first subpixel, and the second side is opposite the first side on a first axis; and, for pixels adjacent on the first axis, either the second subpixels of the adjacent pixels are adjacent to each other on the first axis, or the third subpixels of the adjacent pixels are adjacent to each other on the first axis; and for pixels adjacent on a second axis perpendicular to the first axis, the first subpixels of the adjacent pixels on the second axis are adjacent to each other on the second axis.

In another embodiment, a method for making an electronic device includes forming a plurality of first radiation emitting regions in a spaced apart relation on a substrate; forming a plurality of second and third regions, the second and third regions being disposed on opposite sides of a corresponding first radiation emitting region along a first axis, the second regions are adjacent to each other on a second axis perpendicular to the first axis and the third regions are adjacent to each other on the second axis; forming a pair of second radiation emitting regions in each of the second regions; forming a pair of third radiation emitting regions in each of the third regions; and forming a plurality of pixels, each pixel including a first, a second, and a third radiation emitting region to emit radiation having first, second and third wavelengths, respectively, the second and third radiation emitting regions of a pixel being on opposite sides of the first radiation emitting region in the pixel.

In another embodiment, a device includes a plurality of opto-electronic regions, each opto-electronic region including a plurality of first opto-electronic elements to emit radiation having a first wavelength or to detect radiation having the first wavelength, a plurality of second opto-electronic elements to emit radiation having a second wavelength or to detect radiation having the second wavelength, and a plurality of third opto-electronic elements to emit radiation having a third wavelength or to detect radiation having the third wavelength, the opto-electronic elements being arranged within at least one region, the first opto-electronic elements in the region being arranged relative to a first axis and at least two of the first opto-electronic elements being adjacent in an axis perpendicular to the first axis, the second opto-electronic elements in the region being arranged relative to the first axis and at least two of the second opto-electronic elements being adjacent in an axis perpendicular to the first axis and being disposed on a first side of the first opto-electronic elements in the region, the third opto-electronic elements in the region being arranged relative to the first axis and at least two of the third opto-electronic elements being adjacent in an axis perpendicular to the first axis and being disposed on a second side of the first opto-electronic elements in the region so that the first opto-electronic elements are between the second and third opto-electronic elements along the first axis.

The foregoing general description and the following detailed description are exemplary and explanatory only and are not restrictive of the invention, as defined in the appended claims.

BRIEF DESCRIPTION OF THE DRAWINGS

This invention is illustrated by way of example and not limitation in the accompanying figures.

Figure 1:
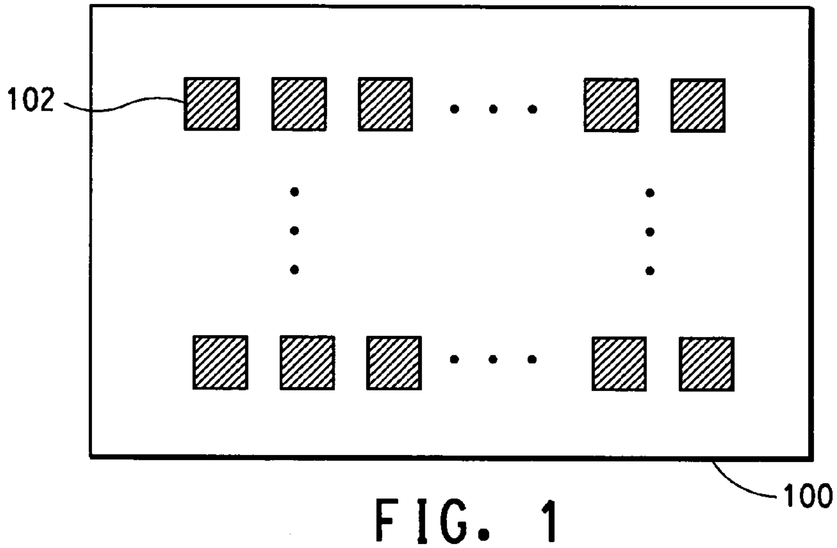
FIG. 1 includes a plan view of an organic electronic device.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any combination. Further, reference to values stated in ranges includes each and every value within that range. It is to be understood that the elements in the figures are not necessarily drawn to scale. For example, the dimensions of some of the elements in the figures may be exaggerated relative to other elements to assist in an understanding of the embodiments of the invention.

Other features and advantages of the invention will be apparent from the following detailed description and from the claims.

DETAILED DESCRIPTION

In one embodiment, an electronic device including a plurality of pixels, each pixel including first, second, and third subpixels, which, from a plan view, a plurality of first subpixels are arranged in a spaced apart relation; for each pixel, the second subpixel is disposed on a first side of the first subpixel, the third subpixel is disposed on a second side of the first subpixel, and the second side is opposite the first side on a first axis; and, for pixels adjacent on the first axis, either the second subpixels of the adjacent pixels are adjacent to each other on the first axis, or the third subpixels of the adjacent pixels are adjacent to each other on the first axis; and for pixels adjacent on a second axis perpendicular to the first axis, the first subpixels of the adjacent pixels on the second axis are adjacent to each other on the second axis. In another embodiment, the second subpixels of the adjacent pixels on the second axis may be adjacent to each other on the second axis and the third subpixels of the adjacent pixels may be adjacent to each other on the second axis. The electronic device may also include a substrate; and an organic active layer disposed on the substrate, where the organic active layer includes the first subpixels. In another embodiment, the second and third subpixels may be formed by depositing guest materials on the organic active layer. Depositing may be performed using a solution deposition technique, a vapor deposition technique, a thermal transfer technique or combinations thereof. The device may also include a plurality of material restricting structures. The organic active layer may be deposited on the substrate using a solution deposition technique, a vapor deposition technique, a thermal transfer technique or combinations thereof. The solution deposition technique may be spin coating, gravure coating, curtain coating, dip coating, slot-die coating, spray coating, continuous nozzle coating, ink jet printing, continuous nozzle printing, gravure printing, screen printing or combinations thereof. In one embodiment, the solution deposition technique is ink jet printing, continuous nozzle printing or combinations thereof. The first, second and third subpixels may emit radiation having first, second, and third wavelengths, respectively.

In another embodiment, a method for making an electronic device includes: forming a plurality of first radiation emitting regions in a spaced apart relation on a substrate; forming a plurality of second and third regions, the second and third regions being disposed on opposite sides of a corresponding first radiation emitting region along a first axis, the second regions are adjacent to each other on a second axis perpendicular to the first axis and the third regions are adjacent to each other on the second axis; forming a pair of second radiation emitting regions in each of the second regions; forming a pair of third radiation emitting regions in each of the third regions; and forming a plurality of pixels, each pixel including a first, a second, and a third radiation emitting region to emit radiation having first, second and third wavelengths, respectively, the second and third radiation emitting regions of a pixel being on opposite sides of the first radiation emitting region in the pixel. The method may also include the step of forming a plurality of material restricting structures on the substrate. The method may also include spin coating the radiation emitting layer on a substrate. The method may also include solution deposition by ink jet printing. The method may also include solution depositing by transfer mask processing. The method may also include solution depositing by evaporation deposition of small organic pigment emissive material. In the method, the radiation having the first wavelength is blue light, the radiation having the second wavelength is red light, and the radiation having the third wavelength is green light.

In another embodiment, a device includes a plurality of opto-electronic regions, each opto-electronic region including a plurality of first opto-electronic elements to emit radiation having a first wavelength or to detect radiation having the first wavelength, a plurality of second opto-electronic elements to emit radiation having a second wavelength or to detect radiation having the second wavelength, and a plurality of third opto-electronic elements to emit radiation having a third wavelength or to detect radiation having the third wavelength, the opto-electronic elements being arranged within at least one region, the first opto-electronic elements in the region being arranged relative to a first axis and at least two of the first opto-electronic elements being adjacent in an axis perpendicular to the first axis, the second opto-electronic elements in the region being arranged relative to the first axis and at least two of the second opto-electronic elements being adjacent in an axis perpendicular to the first axis and being disposed on a first side of the first opto-electronic elements in the region, the third opto-electronic elements in the region being arranged relative to the first axis and at least two of the third opto-electronic elements being adjacent in an axis perpendicular to the first axis and being disposed on a second side of the first opto-electronic elements in the region so that the first opto-electronic elements are between the second and third opto-electronic elements along the first axis.

1. Definitions and Clarification of Terms

Before addressing details of embodiments described below, some terms are defined or clarified.

As used herein, the term "active" when referring to a layer or material is intended to mean a layer or material that exhibits electro-radiative properties. An active layer material may emit radiation or exhibit a change in concentration of electron-hole pairs when receiving radiation.

The terms "array," "peripheral circuitry" and "remote circuitry" are intended to mean different areas or components of the organic electronic device. For example, an array may include pixels, cells, or other structures within an orderly arrangement (usually designated by columns and rows). The pixels, cells, or other structures within the array may be controlled locally by peripheral circuitry, which may lie within the same organic electronic device as the array but outside the array itself. Remote circuitry typically lies away from the peripheral circuitry and can send signals to or receive signals from the array (typically via the peripheral circuitry). The remote circuitry may also perform functions unrelated to the array. The remote circuitry may or may not reside on the substrate having the array.

The term "blue light" is intended to mean radiation that has an emission maximum at a wavelength in a range of approximately 400–500 nm.

The term "charge transport" when referring to a layer, material, member, or structure is intended to mean such layer, material, member, or structure facilitates migration of such charge through the thickness of such layer, material, member, or structure with relative efficiency and small loss of charge.

The term "continuous" and its variants are intended to mean substantially unbroken. In one embodiment, continuously printing is printing using a substantially unbroken stream of a liquid or a liquid composition, as opposed to a depositing technique using drops. In another embodiment, extending continuously refers to a length of a layer, member, or structure in which no significant breaks in the layer, member, or structure lie along its length.

The term "electron withdrawing" is synonymous with "hole injecting." Literally, holes represent a lack of electrons and are typically formed by removing electrons, thereby creating an illusion that positive charge carriers, called holes, are being created or injected. The holes migrate by a shift of electrons, so that an area with a lack of electrons is filled with electrons from an adjacent layer, which give the appearance that the holes are moving to that adjacent area. For simplicity, the terms holes, hole injecting, hole transport, and their variants will be used.

The term "emission maximum" is intended to mean the highest intensity of radiation emitted. The emission maximum has a corresponding wavelength or spectrum of wavelengths (e.g. red light, green light, or blue light).

The term "filter" when referring to a layer, material, member, or structure is intended to mean such layer, material, member, or structure separate from a radiation emitting or radiation-responsive layer, wherein the filter is used to limit the wavelength(s) of radiation transmitted through such layer, material, member, or structure. For example, a red filter layer may allow substantially only red light from the visible light spectrum to pass through the red filter layer. Therefore, the red filter layer filters out green light and blue light.

The term "green light" is intended to mean radiation that has an emission maximum at a wavelength in a range of approximately 500–600 nm.

The term "guest material" is intended to mean a material, within a layer including a host material, that changes the electronic characteristic(s) or the targeted wavelength(s) of radiation emission, reception, or filtering of the layer compared to the electronic characteristic(s) or the wavelength(s) of radiation emission, reception, or filtering of the layer in the absence of such material.

The term "high work function" when referring to a layer or material is intended to mean a layer or material having a work function of at least approximately 4.4 eV.

The term "low work function" when referring to a layer or material is intended to mean a layer or material having a work function no greater than about 4.4 eV.

The term "material restricting structure" refers to a physical structure or a material treatment such as hydrophilic or hydrophobic areas on a surface used to confine a liquid during processing. A material restricting structure may also be called a dam, dividers, or a frame.

The term "maximum operating potential difference" is intended to mean the greatest difference in potential between electrodes of a radiation-emitting component during normal operation of such radiation-emitting component.

The term "migrate" and its variants are intended to be broadly construed as movement into or within a layer or material without the use of an external electrical field, and covers dissolution, diffusion, emulsifying, suspending (for a suspension), or any combination thereof. Migrate does not include ion implantation.

The term "most" is intended to mean more than half.

The term "organic electronic device" or sometimes just "electronic device" is intended to mean a device including one or more organic semiconductor layers or materials. An organic electronic device includes, but is not limited to: (1) a device that converts electrical energy into radiation (e.g., a light-emitting diode, light emitting diode display, diode laser, or lighting panel), (2) a device that detects a signal using an electronic process (e.g., a photodetector, a photoconductive cell, a photoresistor, a photoswitch, a phototransistor, a phototube, an infrared ("IR") detector, or a biosensors), (3) a device that converts radiation into electrical energy (e.g., a photovoltaic device or solar cell), (4) a device that includes one or more electronic components that include one or more organic semiconductor layers (e.g., a transistor or diode), or any combination of devices in items (1) through (4).

The term "pixel" is intended to mean the smallest complete, repeating unit of an array. The term "subpixel" is int ended to mean a portion of a pixel that makes up only a part, but not all, of a pixel. In a full-color display, a full-color pixel can comprise three sub-pixels with primary colors in red, green and blue spectral regions. A monochromatic display may include pixels but no subpixels. A sensor array can include pixels that may or may not include subpixels.

The term "primary surface" is intended to mean a surface of a substrate from which an electronic component is subsequently formed.

The term "radiation-emitting component" is intended to mean an electronic component, which when properly biased, emits radiation at a targeted wavelength or spectrum of wavelengths. The radiation may be within the visible-light spectrum or outside the visible-light spectrum (ultraviolet (UV) or infrared (IR)). A light-emitting diode is an example of a radiation-emitting component.

The term "radiation-responsive component" is intended to mean an electronic component can sense or otherwise respond to radiation at a targeted wavelength or spectrum of wavelengths. The radiation may be within the visible-light spectrum or outside the visible-light spectrum (UV or IR). Photodetectors, IR sensors, biosensors, and photovoltaic cells are examples of radiation-responsive components.

The term "red light" is intended to mean radiation that has an emission maximum at a wavelength in a range of approximately 600–700 nm.

The phrase "room temperature" is intended to mean a temperature in a range of approximately 20–25° C.

The term "substantially free" when referring to a specific material is intended to mean that a trace amount of the specific material is present, but not in a quantity that significantly affects the electrical or radiative (emission, reception, transmission, or any combination thereof) properties of a different material in which the specific material resides.

The term "substantially liquid" when referring to a layer, material, or composition is intended to mean that a layer or material is in the form of a liquid, solution, dispersion, or a suspension. A substantially liquid material can include one or more liquid media and is capable of significantly flowing if not properly retained.

The term "solids" is intended to mean one or more materials, which in the absence of a liquid medium, are in a substantially solid state at approximately 20° C. Note that such one or more materials that are dissolved within a solution are still considered solids for the purpose of this specification.

The term "visible light spectrum" is intended to mean a radiation spectrum having wavelengths corresponding to approximately 400–700 nm.

Group numbers corresponding to columns within the periodic table of the elements use the "New Notation" convention as seen in the CRC Handbook of Chemistry and Physics, 81st Edition (2000).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the organic light-emitting diode display, photodetector, photovoltaic, and semiconductor arts.

2. Organic Electronic Device

FIG. 1 is a plan view of an organic electronic device 100. The organic electronic device 100 comprises a plurality of pixels 102. The organic electronic device 100 may detect radiation or may emit radiation. As an illustrative embodiment, the organic electronic device 100 is described as emitting light and displaying images. The pixels 102 are illustrated in FIG. 1 as being arranged in a matrix formed of rows and columns. Other arrangements of the pixels 102 may be used. The organic electronic device may include peripheral circuitry and remote circuitry (not shown) for controlling the plurality of pixels 102.

The organic electronic device 100 may include, for example, an active matrix array or a passive matrix array. In one embodiment, the organic electronic device 100 may include semiconducting organic materials.

Figure 5:
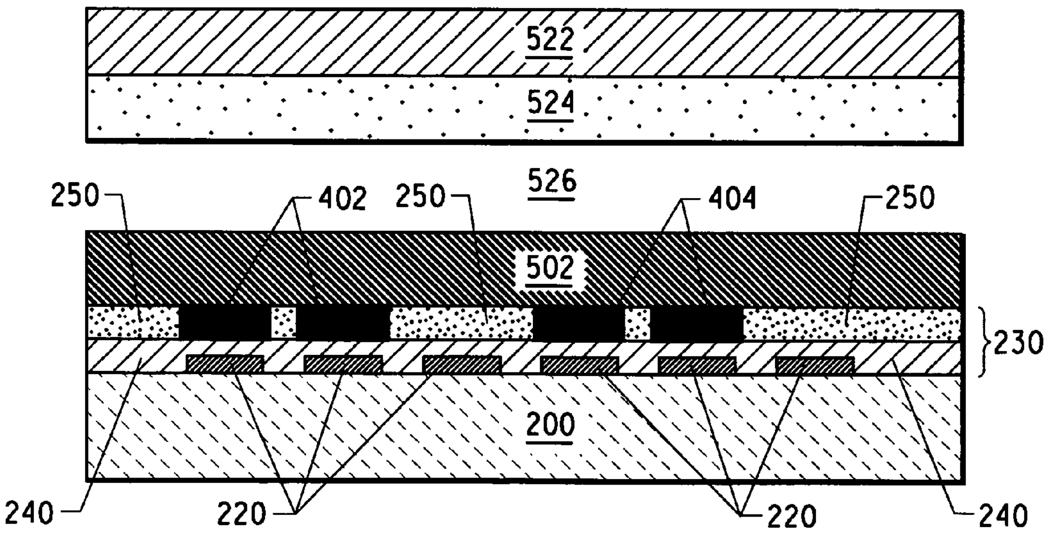
FIG. 5 includes the substrate of FIG. 4 after forming a substantially completed organic device.
Figure 6:
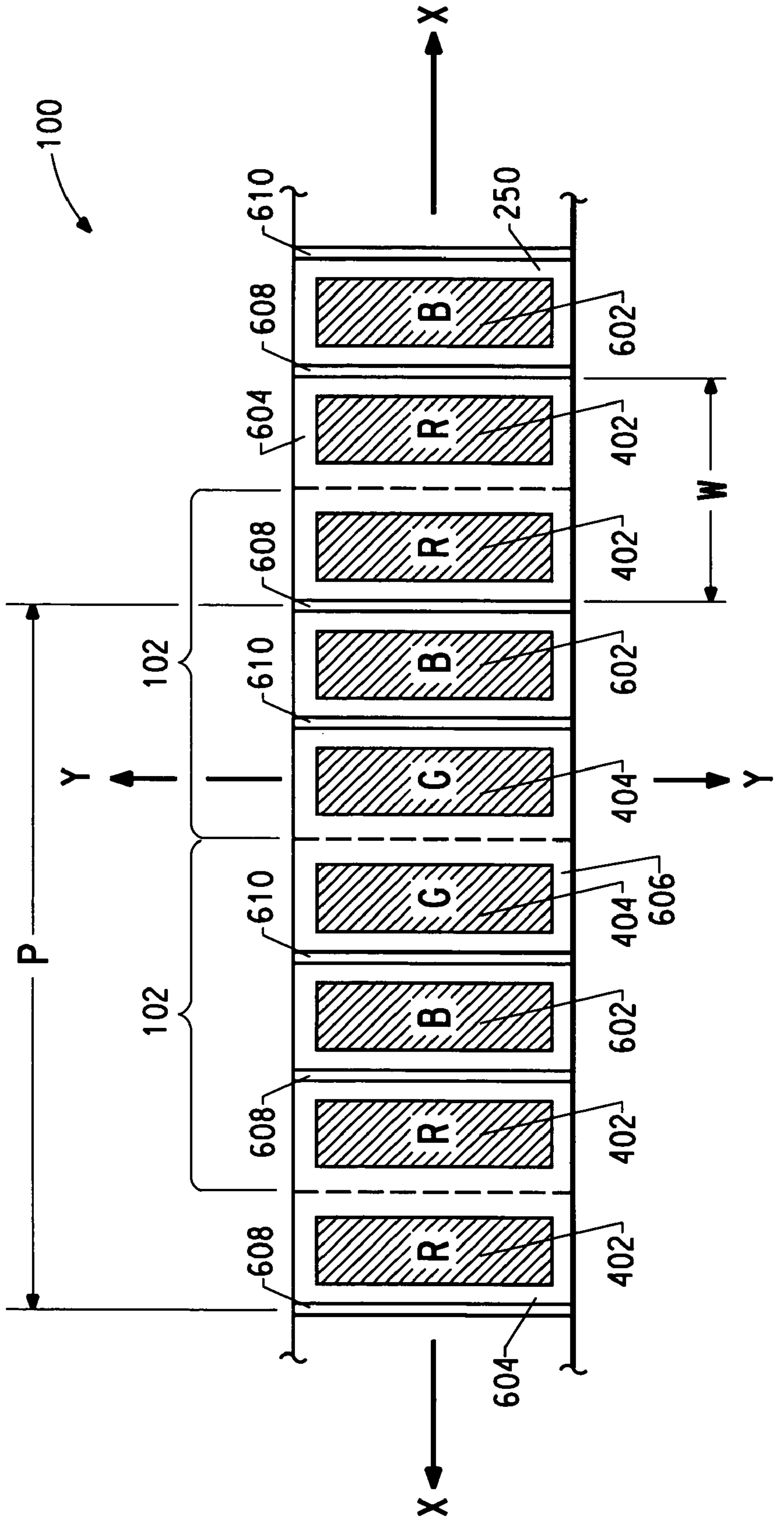
FIG. 6 includes a partial top plan view of the organic electronic device of FIG. 1.
Figure 7:
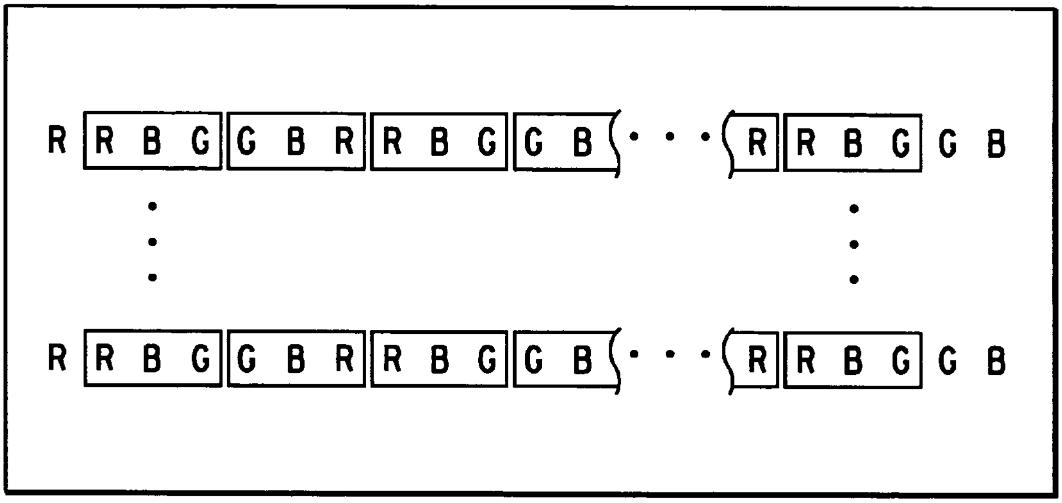
FIG. 7 includes a top plan view of the pixel arrangement of the organic electronic device of FIG. 1.

The fabrication of the organic electronic device 100 is next described in conjunction with FIGS. 2–5, and the pixel arrangement is described in conjunction with FIGS. 6–7. The organic electronic device 100 may be fabricated using the techniques described in co-pending patent application Ser. Nos. 10/705,321 and 10/889,883, entitled "ORGANIC ELECTRONIC DEVICE HAVING AN ORGANIC LAYER WITH A REGION INCLUDING A GUEST MATERIAL AND PROCESSES FOR FORMING AND USING THE SAME" filed on Nov. 10, 2003 and Jul. 13, 2004 respectively, the subject matter which is incorporated herein by reference.

3. Fabrication Before Introduction of Liquid Composition(s)

Figure 2:
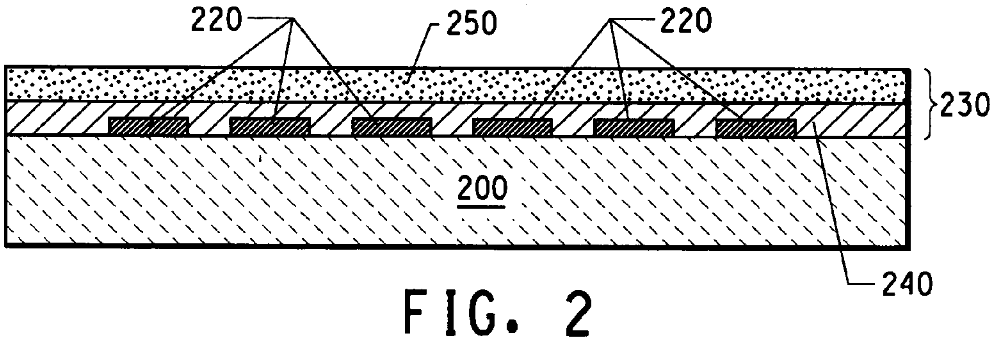
FIG. 2 includes a cross-sectional view of a portion of a substrate including first electrodes and portions of an organic layer.

Attention is now directed to an exemplary embodiment illustrated in FIGS. 2–5. Referring to FIG. 2, first electrodes 220 are formed over positions of a substrate 200. The substrate 200 may be a conventional substrate as used in the organic electronic device arts. The substrate 200 may be rigid or flexible, and may comprise a glass, ceramic, metal, organic material, or combinations thereof.

In this exemplary embodiment, the first electrodes 220 act as anodes and may include one or more conductive layers. The surface of the first electrodes 220 furthest from the substrate 200 may include a high work function material. The first electrodes 220 may include one or more of layers of indium tin oxide, aluminum tin oxide, or other materials conventionally used for anodes within organic electronic devices.

The first electrodes 220 may be formed using a solution coating, printing, or vapor (chemical or physical) deposition process. The first electrodes 220 may be formed as a patterned layer (e.g., using a shadow mask) or by depositing the layer(s) over all the substrate 200 and using a conventional patterning technique.

Figure 3:
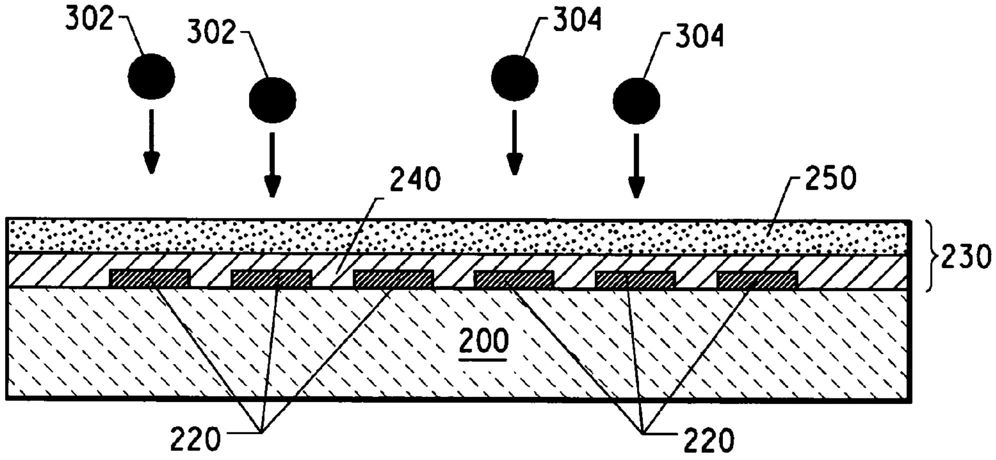
FIG. 3 includes the substrate of FIG. 2 as guest materials are added the organic layer.
Figure 4:
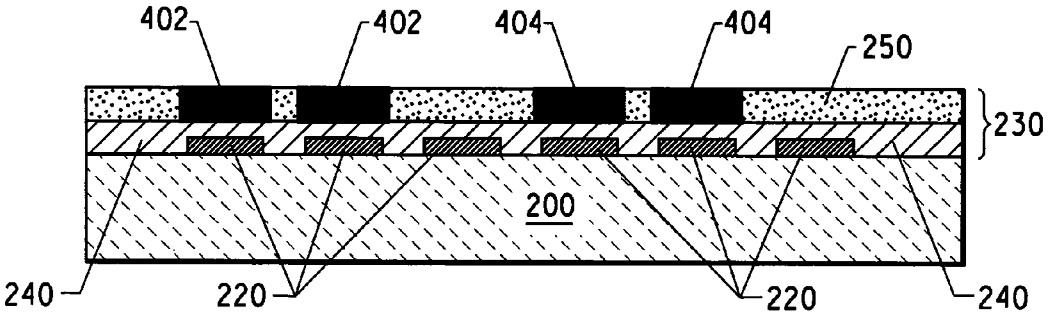
FIG. 4 includes the substrate of FIG. 3 after the guest materials have migrated into the organic layer.

An organic layer 230 may be formed over the first electrodes 220 as in FIG. 2. The organic layer 230 may include one or more layers. For example, the organic layer 230 may include a charge transport layer 240 and an organic active layer 250 as illustrated in FIG. 3. Charge transport layers may lie along both sides of the organic active layer 250, the charge transport layer may overlie rather than underlie the organic active layer 250, or the organic active layer 250 may be used without a charge transport layer 240. When the charge transport layer 240 lies between the first electrodes (anodes) 220 and the organic active layer 250, the charge transport layer 240 is a hole-transport layer, and when the charge transport layer lies between the organic active layer 250 and subsequently formed second electrode(s) that act as cathodes, the charge transport layer is an electron-transport layer. The embodiment of FIG. 2 has a charge transport layer 240 that functions as the hole-transport layer.

The charge transport layer 240 and the organic active layer 250 are formed sequentially over the first electrodes 220. In addition to facilitating transport of charge from the first electrodes 220 to the organic active layer 250, the charge transport layer 240 may also function as a charge injection layer facilitating injection of charged carriers into the organic active layer 250, a planarization layer over the first electrodes 220, a passivation or chemical barrier layer between the first electrodes 220 and the organic active layer 250, or any combination thereof. The charge transport layer 240 and the organic active layer 250 can be formed by solution coating, printing, thermal transfer or vapor depositing or combinations thereof. The solution deposition technique may be, for example, spin coating, gravure coating, curtain coating, dip coating, slot-die coating, spray coating, continuous nozzle coating, ink jet printing, continuous nozzle printing, gravure printing, screen printing or combinations thereof. One or both of the charge transport layer 240 and the organic active layer 250 may be cured after application.

The composition of the organic active layers 250 typically depends upon the application of the organic electronic device. In the embodiment of FIG. 2, the organic active layer 250 is used in radiation-emitting components. The organic active layer 250 can include material(s) as conventionally used as organic active layers in organic electronic devices and can include one or more small molecule materials, one or more polymer materials, or any combination thereof. Skilled artisans will be capable of selecting appropriate material(s), layer(s) or both for the organic active layer 250.

As formed, the organic layer 230 (including charge transport layer 240 and organic active layer 250) are substantially continuous over an array of organic electronic components to be formed. In one embodiment, the organic layer 230 may be substantially continuous over the entire substrate, including the peripheral and remote circuitry areas. It is to be understood that the organic layer 230 has regions where the organic layer 230 is locally thinner, but it is not discontinuous over the area of the substrate 200 in which the organic layer 230 is intended to be formed (e.g., the array). Referring to FIG. 2, the organic layer 230, including one or both of the charge transport layer 240 and the organic active layer 250, is locally thinner in the area proximate the first electrodes 220 and locally thicker away from the first electrodes 220.

In another embodiment, material restricting structures may be formed on the substrate. In this embodiment, the organic layer 230 may be formed over the substrate 200 and the material restricting structures. It is to be understood that the organic layer 230 may be locally thinner along the sides near the top of the material restricting structures; however, the organic layer 230 has no substantial discontinuity over the material restricting structures between first electrodes 220.

One or more liquid compositions (illustrated as circles 302 and 304) may be placed over the organic layer 230 as in FIG. 3. In one embodiment, the organic active layer 250 includes a host material that can emit blue light, liquid composition 302 may include a red guest material, and liquid composition 304 may include a green guest material. Before the placement, the organic layer 230 may or may not be substantially solid. The liquid compositions 302 and 304 may be placed over the organic layer 230 using a precision dispensing system, such as an inkjet printer or a continuous nozzle printer. Alternatively, a material restricting structure, stencil mask, or other template may be used to control the areas in which the liquid compositions 302 and 304 contact the organic layer 230.

The liquid compositions 302 and 304 may be placed over the organic layer 230 sequentially or simultaneously. For simplicity, each of the liquid compositions 302 and 304 in FIG. 2 are referred to as "drops," whether or not the liquid compositions 302 and 304 are introduced as drops, or, for example, as a continuous stream. A number of parameters can be varied that affect the initial area of the organic layer 230 affected by the liquid compositions 302 and 304. For example, such parameters are selected from a group consisting of drop volume, spacing between organic electronic components, drop viscosity, and any combination thereof.

The use of material restricting structures may reduce the likelihood of lateral migration, however, the volume of the liquid composition should not be so much as to overflow the "levee" formed by the material restricting structures, such that it could migrate into an adjacent well.

After the liquid compositions 302 and 304 are placed over the organic layer 230 a portion of the guest material(s) within the liquid compositions 302 and 304 may, however, migrate into the organic active layer 250, and the liquid medium (media) of the liquid compositions 302 and 304 is evaporated to give the organic layer 230 with doped regions 402 and 404. In this embodiment, region 402 is designed to emit red light, and region 404 is designed to emit green light. After evaporation, the organic layer 230 includes regions 402 and 404 that are substantially solid. In another embodiment, guest materials in liquid compositions 302 and 304 do not migrate into the organic active layer 250. Instead, the emissive materials in liquid composition 302 and 304 form organic active layers on top of organic active layer 250 and form a red emitting region and green emitting region, respectively.

4. Remainder of Fabrication

As discussed above, a charge transport layer 240 that functions as an electron-transport layer may be formed over the organic active layer 250. A second electrode 502 is formed over the organic layer 230 including charge transport layer 240 and the organic active layer 250 as illustrated in FIG. 5. In this embodiment, the second electrode 502 acts as a common cathode for an array. The surface of the second electrode 502 includes a low work function material. The second electrode 502 includes one or more of a Group 1 metal, Group 2 metal, or other materials conventionally used for cathodes within organic electronic devices.

The second electrode 502 may be formed using a coating, printing, or vapor (chemical or physical) deposition process. The second electrode 502 may be formed as a patterned layer (e.g., using a shadow mask) or by depositing the layer(s) over the array and using a conventional patterning sequence.

Other circuitry not illustrated in FIG. 5 may be formed using any number of the previously described or additional layers. Additional insulating layer(s) and interconnect level(s) may be formed to allow for circuitry in peripheral areas that may lie outside the array. Such circuitry may include row or column decoders, strobes (e.g., row array strobe, column array strobe), or sense amplifiers. Alternatively, such circuitry may be formed before, during, or after the formation of any layers of FIG. 5.

A lid 522 with a desiccant 524 is attached to the substrate 200 at locations outside the array to form a substantially completed device. A gap 526 lays between the second electrode 502 and the desiccant 524. The materials used for the lid 522 and desiccant 524 and the attaching process are conventional.

FIG. 5 includes one full pixel that has red, green, and blue radiation-emitting components and portions of other pixels. The red radiation-emitting components include the red-doped regions 402, and the green components include the green-doped regions 404, and the blue components include undoped portions (substantially free of the red and green guest materials) of the organic active layer 250 lying between two of the first electrodes 220 and the second electrode 502.

5. Organic Electronic Device

FIG. 6 includes an illustration of a partial top plan view of an organic electronic device 100.

FIG. 7 includes an illustration of a top plan view of the pixel arrangement of an organic electronic device 100.

Referring to FIG. 6, the organic electronic device 100 includes a plurality of pixels 102 that may be arranged in rows and columns. For simplicity and clarity, FIG. 6 includes a portion of the organic electronic device 100, and illustrates two full pixels 102 arranged in a row.

The organic electronic device 100 comprises a plurality of first radiation emitting regions 602 spaced apart at regular intervals along lines parallel to a first axis X (e.g., in horizontal rows) and along lines parallel to a second axis Y that may be perpendicular to the first axis (e.g., in vertical columns). In one embodiment, the organic active layer 250 is coated on the substrate as described above. In one embodiment, the first radiation emitting regions 602 emit blue light, and for illustrative purposes are described herein to emit blue light.

The organic electronic device 100 comprises a plurality of radiation emitting regions 604 and a plurality of radiation emitting regions 606. In an alternative embodiment, the regions 602, 604 and 606 may be radiation detecting regions. In still a further embodiment, region 602, 604 and 606 can be radiation emitting, radiation detecting, or combinations thereof. For illustrative purposes, the regions 602, 604 and 606 are described as radiation emitting regions. The regions 604 and 606 may be formed, for example, by solution deposition of a substantially liquid composition. In one embodiment, the regions 604 are formed between pairs of material restricting structures 608 and the regions 606 are formed between pairs of material restricting structures 610. In another embodiment, the regions 604 and 606 are not formed between material restricting structures, but the shape of the regions is formed by dispersion of the substantially liquid composition.

The regions 604 are disposed in a spaced apart relation along lines parallel to a first axis so that each region 604 is disposed on one side of a region 602 in a corresponding pixel 102. The regions 606 are disposed in a spaced apart relation so that each region 606 is disposed on a second side of a region 602. In this arrangement, a first radiation emitting region 602 is between a region 604 and a region 606. At the respective ends of a row, this selective arrangement is not required. Instead, the arrangement is selectively formed in an area of the device 100 that forms the pixels 102 and thereby can be used for displaying or detecting a full color image.

Each region 604 comprises a pair of regions 402. Each second region 606 comprises a pair of regions 404. A pixel 102 comprises a first subpixel formed of a region 602, a second subpixel formed of a region 402 formed in a region 604 adjacent region 602, and a third subpixel formed of a region 404 formed in region 606 adjacent region 602. A region 604 and a region 606 are divided so that one region 402 and one region 404, respectively, are in a corresponding pixel 102. Thus, regions 604 and 606 may provide regions 402 and 404, respectively, for two pixels 102. In one embodiment, the pixels 102 are arranged with the regions 604, 602 and 606 in sequence in a row to provide a pixel arrangement of RRBGGBRRBGGB and so forth along a row as illustrated in FIG. 7. The pixels 102 are arranged in columns so that the regions 602, 604, and 606 of the pixels 102 are arranged along, or parallel to, a second axis (e.g., vertical, forming columns).

In the illustrative example of red, green and blue regions in a pixel 102, red radiation emitting regions R are adjacent for adjacent pixels in a row. Likewise, the green radiation emitting elements G are adjacent for adjacent pixels in a row. In an axis perpendicular to the axis of the rows, the pixels 102 are arranged in columns so that the regions 602, 604 and 606 are arranged in columns.

In one embodiment, the plurality of regions 402 are formed by ink jet printing a corresponding region 604 on layer 230 and forming a pair of regions 402 as an active area of the region 604. Likewise, the plurality of regions 404 are formed by ink jet printing a corresponding region 606 on the layer 230 and forming a pair of regions 404 as an active area of the region 606.

The regions 402 and 404 emit light having second and third wavelengths, respectively. In one embodiment, the regions 404 emit green light, and for illustrative purposes are described herein to emit green light. In one embodiment, the regions 402 emit red light, and for illustrative purposes are described herein to emit red light. In one embodiment, the regions 604 and 606 are printed using continuous nozzle printing techniques.

In this embodiment, the regions 604 and 606 are formed, such as by ink jet printing, to have widths greater than a single light emitting element. In an embodiment providing a 200 dpi organic electronic device, the pitch P of a pixel printed region is 254 microns and the width W of a printed region 604 or 606 is 84.7 microns, similar to that of a conventional 100 dpi organic electronic device using stripe ink jet printing or ink jet printing using confinement.

In this embodiment, each pixel 102 includes the corresponding subpixel RGB components for each pixel but uses an alternation of the order of the light emitting elements relative to a conventional RGBRGB arrangement of the light emitting elements in a pixel to reduce the need for highly accurate droplet placement or volume control of the droplet to obtain homogeneity.

In an alternate embodiment, small-sized organic pigment light emitting diodes (SMOLED) may be deposited for an RGB organic electronic device in a striped configuration. In this embodiment, evaporation masks having larger holes may be used to control the deposit of the emissive material onto the regions 604 and 606.

Other materials having different luminous efficiencies, such as blue emitting materials, may be used. The light emitting elements of the pixels may be formed to have different sizes. The width of the regions 604 and 606 may be adjusted to alter the emissive areas of the organic electronic device without changing the overall pitch P of the pixels 102 that are ink jet printed. In some instances, this allows for a reduced light emitting current usage to thereby enhance the reliability and lifetime of the elements.

Other patterning techniques may use the pixel arrangement and method for full color organic electronic device pixels and image sensor pixels. For a given pattern width W, the full color pitch with a traditional stripe pattern will be 3W, while the patterning approach disclosed in this invention may be 1.5W (presuming color from a hybrid process). One example is the RGB pixels made with thermal transfer approach. Another example is full color filters used for LCDs and CCD cameras. A third example is the color imaging pixels made with organic semiconductors.

This approach can also be useful for medium density organic electronic devices, which allows more ink jet drops per pixel area to increase the total volume of the ink per pixel, reduce ink jet volume variation, and thus improve organic electronic device homogeneity.

In another embodiment, an inkjet-printed substrate may use photoresist structures to confine the printed ink. In this embodiment, the number of these confining structures may be reduced, which results in a larger aperture ratio for the printed panel, as less space on the substrate is used for confinement.

Although the pixels are described herein as being arranged as an array of rows and columns, other configurations of the pixels may be used. The pixels may be arranged in regions that have various shapes and orientations. As an illustrative example, the pixels may be arranged in regions that are activated according to a preset pattern, such as alphanumeric characters.

In another embodiment, the pixel arrangements described herein may be used for devices other than organic electronic devices, such as opto-electronic devices that include opto-electronic elements that may emit or detect radiation or both.

Although the pixels are described herein as including three radiation-emitting elements, radiation-detecting or receiving elements, or opto-electronic elements, other numbers may be used within a pixel.

6. Operation of the Organic Electronic Device

If the organic electronic components within the organic electronic device are radiation-emitting components, appropriate potentials are placed on the first electrodes 220 and second electrode 502. As one or more of the radiation-emitting components become sufficiently forward biased, such forward biasing can cause radiation to be emitted from the organic active layer 250. Note that one or more of the radiation-emitting components may be off during the normal operation of the organic electronic device. For example, the potentials and current used for the radiation-emitting components may be adjusted to change the intensity of color emitted from such components to achieve nearly any color within the visible light spectrum. Referring to the three first electrodes 220 in FIG. 5, for red to be displayed, radiation-emitting component including doped region 402 will be on, while the other two radiation-emitting components 404 are off. In a display, rows and columns can be given signals to activate the appropriate sets of radiation-emitting components to render a display to a viewer in a human-understandable form.

If the organic electronic components within the organic electronic device are radiation-receiving components, the radiation-receiving components may be reversed biased at a predetermined potential (e.g., second electrode 502 has a potential approximately 5–15 volts higher than the first electrode(s) 220). If radiation at the targeted wavelength or spectrum of wavelengths is received by the organic active layer, the number of carriers (i.e., electron-hole pairs) within the organic active layer increases and causes an increase in current as sensed by sense amplifiers (not shown) within the peripheral circuitry outside the array.

In a voltaic cell, such as a photovoltaic cell, light or other radiation can be converted to energy that can flow without an external energy source. The conductive members 220 and 502 may be connected to a battery (to be charged) or an electrical load. After reading this specification, skilled artisans are capable of designing the electronic components, peripheral circuitry, and potentially remote circuitry to best suit their particular needs for an organic electronic device and method as disclosed.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense and all such modifications are intended to be included within the scope of invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. An electronic device comprising:

a plurality of pixels, each pixel comprising first, second, and third subpixels, wherein, from a plan view, a plurality of first subpixels are arranged in a spaced apart relation;

for each pixel, the second subpixel is disposed on a first side of the first subpixel, the third subpixel is disposed on a second side of the first subpixel, and the second side is opposite the first side on a first axis;

for pixels adjacent on the first axis, either the second subpixels of the adjacent pixels are adjacent to each other on the first axis, or the third subpixels of the adjacent pixels are adjacent to each other on the first axis; and for pixels adjacent on a second axis perpendicular to the first axis, the first subpixels of the adjacent pixels on the second axis are adjacent to each other on the second axis.

2. The electronic device of claim 1 further comprising:

a substrate; and an organic active layer disposed on said substrate, wherein the organic active layer comprises the first subpixels.

3. The electronic device of claim 2 wherein the second and third subpixels are formed by depositing a guest material on the organic active layer.

4. The electronic device of claim 3 wherein depositing is performed using a solution deposition technique, a vapor deposition technique, a thermal transfer technique or combinations thereof.

5. The electronic device of claim 4 wherein the solution deposition technique is ink jet printing, continuous nozzle printing or combinations thereof.

6. The electronic device of claim 3 further comprising a plurality of material restricting structures.

7. The electronic device of claim 3 wherein the organic active layer is deposited on said substrate using a solution deposition technique, a vapor deposition technique, a thermal transfer technique or combinations thereof.

8. The electronic device of claim 7 wherein the solution deposition technique is spin coating, gravure coating, curtain coating, dip coating, slot-die coating, spray coating, continuous nozzle coating, ink jet printing, continuous nozzle printing, gravure printing, screen printing or combinations thereof.

9. The electronic device of claim 1, wherein the second subpixels of the adjacent pixels on the second axis are adjacent to each other on the second axis and the third subpixels of the adjacent pixels are adjacent to each other on the second axis.

10. The electronic device of claim 1 wherein the first, second and third subpixels emit radiation having first, second, and third wavelengths, respectively.

11. A method for making an electronic device, comprising:

forming a plurality of first radiation emitting regions in a spaced apart relation on a substrate;

forming a plurality of second and third regions, the second and third regions being disposed on opposite sides of a corresponding first radiation emitting region along a first axis, the second regions are adjacent to each other on a second axis perpendicular to the first axis and the third regions are adjacent to each other on the second axis;

forming a pair of second radiation emitting regions in each of said second regions;

forming a pair of third radiation emitting regions in each of said third regions; and forming a plurality of pixels, each pixel comprising a first, a second, and a third radiation emitting region to emit radiation having first, second and third wavelengths, respectively, the second and third radiation emitting regions of a pixel being on opposite sides of the first radiation emitting region in the pixel.

12. The method of claim 11 further comprising:

forming a plurality of material restricting structures on said substrate.

13. The method of claim 12 further comprising spin coating the radiation emitting layer on a substrate.

14. The method of claim 13 wherein the solution depositing is ink jet printing.

15. The method of claim 11 wherein the solution depositing is ink jet printing.

16. The method of claim 11 wherein the solution depositing is transfer mask processing.

17. The method of claim 11 wherein the solution depositing is evaporation depositing of small organic pigment emissive material.

18. The method of claim 11 wherein the radiation having the first wavelength is blue light, the radiation having the second wavelength is red light, and the radiation having the third wavelength is green light.

19. A device comprising:

a plurality of opto-electronic regions, each opto-electronic region comprising a plurality of first opto-electronic elements to emit radiation having a first wavelength or to detect radiation having the first wavelength, a plurality of second opto-electronic elements to emit radiation having a second wavelength or to detect radiation having the second wavelength, and a plurality of third opto-electronic elements to emit radiation having a third wavelength or to detect radiation having the third wavelength, the opto-electronic elements being arranged within at least one region, the first opto-electronic elements in said region being arranged relative to a first axis and at least two of the first opto-electronic elements being adjacent in an axis perpendicular to the first axis, the second opto-electronic elements in said region being arranged relative to the first axis and at least two of the second opto-electronic elements being adjacent in an axis perpendicular to the first axis and being disposed on a first side of said first opto-electronic elements in said region, the third opto-electronic elements in said region being arranged relative to the first axis and at least two of the third opto-electronic elements being adjacent in an axis perpendicular to the first axis and being disposed on a second side of said first opto-electronic elements in said region so that the first opto-electronic elements are between the second and third opto-electronic elements along the first axis.

* * * * *